United States Patent [19]
Kubo et al.

[11] Patent Number: 5,982,725
[45] Date of Patent: Nov. 9, 1999

[54] METHOD AND APPARATUS FOR CHECKING THE QUALITY OF CD-ROMS OR THE LIKE FOR READING THEM AT MATCHING SPEEDS

[75] Inventors: Mitsumasa Kubo, Tachikawa; Yukihiko Okada, Musashino, both of Japan

[73] Assignee: Teac Corporation, Tokyo, Japan

[21] Appl. No.: 08/888,881

[22] Filed: Jul. 7, 1997

[30] Foreign Application Priority Data

Jul. 12, 1996 [JP] Japan ................................. 8-203280
Nov. 29, 1996 [JP] Japan ................................. 8-334519

[51] Int. Cl.[6] .................................................. G11B 7/00
[52] U.S. Cl. ............................................. 369/50; 369/54
[58] Field of Search ................................ 369/50, 58, 47, 369/48, 32, 54

[56] References Cited

U.S. PATENT DOCUMENTS

| | | | |
|---|---|---|---|
| 4,623,939 | 11/1986 | Machida et al. | 369/50 |
| 4,736,263 | 4/1988 | Takahashi et al. | 369/50 |
| 5,087,997 | 2/1992 | Osada et al. | 369/32 |
| 5,499,105 | 3/1996 | Wakui | 360/77.06 |
| 5,644,561 | 7/1997 | Son et al. | 369/50 |
| 5,691,968 | 11/1997 | Tomishima et al. | 369/50 |
| 5,701,284 | 12/1997 | Lee | 369/50 |
| 5,726,958 | 3/1998 | Min | 369/50 |
| 5,740,356 | 4/1998 | Liang et al. | 369/53 |
| 5,742,446 | 4/1998 | Tian et al. | 369/50 |
| 5,745,457 | 4/1998 | Hayashi et al. | 369/50 |
| 5,748,591 | 5/1998 | Nakai | 369/50 |
| 5,764,610 | 6/1998 | Yoshida et al. | 369/50 |
| 5,774,292 | 6/1998 | Georgiou et al. | 369/50 |
| 5,796,691 | 8/1998 | Furukawa et al. | 369/50 |
| 5,805,546 | 9/1998 | Ando | 369/50 |
| 5,815,478 | 9/1998 | Kim | 369/50 |
| 5,835,462 | 11/1998 | Mimnagh | 369/50 |
| 5,862,113 | 1/1999 | Tsuyuguchi et al. | 369/50 |
| 5,877,623 | 3/1999 | Min | 369/239 |

*Primary Examiner*—Nabil Hindi
*Attorney, Agent, or Firm*—Woodcock Washburn Kurtz Mackiewicz & Norris LLP

[57] ABSTRACT

CD-ROMS of poor quality, such as those having eccentric center holes or uneven weight distributions circumferentially, are easy to wobble or otherwise vibrate when driven at high speed, overloading tracking and focusing servos and inviting read errors and retries. Each CD-ROM on being loaded into a CD-ROM drive is therefore checked as to its quality in terms of the speed of rotation at which the disk drive motor gains a steady state on being started up at a full supply voltage. The poorer the disk quality, the lower is the steady state speed of motor rotation. A poor quality disk is read at four times the standard audio CD speed, an intermediate quality disk at eight times that speed, and a good quality disk at twelve times that speed.

10 Claims, 12 Drawing Sheets

METHOD AND APPARATUS FOR CHECKING THE QUALITY OF CD-ROMS OR THE LIKE FOR READING THEM AT MATCHING SPEEDS

BACKGROUND OF THE INVENTION

This invention relates to the recovery of data from rotating data storage disks such as, typically, compact disks (CDs) used as read-only memories (ROMs) in computer systems. More specifically, the invention concerns how to determine optimum speeds of rotation for CD-ROMs or like data storage disks of varying physical qualities for error-free, and hence speedier, reading thereof.

Although originally developed for consumer audio reproduction in place of analog phonograph records, CDs have now found widespread commercial acceptance as compact, high-speed, large-capacity ROMs for computers. The only difference of CD-ROMs from audio CDs is that the CD-ROMS are driven at speeds up to twelve times as high as the standard audio CD speed (1.2–1.4 meters per second).

There have been problems left unsolved in use of CD-ROMs with high-speed CD-ROM drives in computer systems. CD-ROMs are presently being made under the same design specifications and manufacturing standards as low-speed audio CDs. Inevitably, therefore, a substantial percentage of CD-ROMs on the market are not of truly satisfactory quality for use as high-speed computer data storage media. Some have their center holes cut eccentrically; others have an uneven weight distribution circumferentially. When driven at a speed as high as, say, 12 times the standard audio CD speed, such eccentric disks are very likely to overload the tracking servo of the CD-ROM drive whereby the radial position of the beam spot on the disk is maintained in alignment with the spiral data track. The overloading of the tracking servo may result in the overheating of the voice-coil actuator for tracking control, in the degradation of its performance and, in the worst case, in the burning of the actuator coil.

Such low-grade disks are also very easy to wobble when driven at high speed. Disk wobbling may go so far as to overload the beam focusing servo of the CD-ROM drive, again resulting in the overheating of the focusing actuator of voice-coil construction, in the degradation of its performance and, in the worst case, in the burning of the focusing actuator coil. The malfunctioning of both tracking and focusing servos is very undesirable because of ensuing read errors and retries, which is very time-consuming and so runs counter to the objective of high speed data recovery for which CD-ROMs are intended.

The wobbling of low grade disks can give rise to additional inconveniences. A wobbling disk may cause vibration of the complete CD-ROM drive and, in consequence, of the hard disk drive (HDD) in particular which is currently being preferentially built into the computer system along with the CD-ROM drive. The vibration of the HDD is even more undesirable because it may invite both read and write errors, to the detriment of the reliability of the complete computer system. Even if not so excessive as to cause read and write errors, the vibration of the CD-ROM drive certainly gives a shoddy image to the user or to prospective buyers.

It might be contemplated that all such troubles and inconveniences would be avoidable if only high quality CD-ROMs, altogether free from the physical defects pointed out earlier, were used. CD-ROM drive manufacturers cannot, and should not, expect their products to be used only that way, since in the current state of affairs the existence of poor quality CD-ROMs must be more or less taken for granted.

SUMMARY OF THE INVENTION

The present invention has it as an object to enable speedy data recovery from CD-ROMs or other data storage disks of low quality without any such troubles and inconveniences as have been encountered heretofore.

Another object of the invention is to recover data from disks of varying physical qualities at the highest possible speed suiting each particular disk without causing read errors or retries.

Still another object of the invention is to make utmost use of the preexisting parts and components of CD-ROM drives or like apparatus in order that the inventive concepts may be carried out in such apparatus without any substantial alteration in construction.

Briefly summarized in one aspect thereof, the invention provides what may be termed a disk check method, suitable for implementation in an apparatus for data recovery from rotating data storage disks of varying physical qualities, the apparatus having a disk drive motor for imparting rotation to a disk, and a power supply for powering the disk drive motor.

The disk check method, or a method of determining a speed at which each disk is to be read according to its quality, is such that a prescribed voltage, preferably a full supply voltage, is first applied from the power supply to the disk drive motor thereby causing rotation thereof together with a data storage disk loaded into the apparatus. Then, upon lapse of a preassigned length of time from the moment the prescribed voltage is started to be applied to the motor, the steady state speed of rotation of the motor is detected, the motor being in steady state rotation at that time because the preassigned length of time is not less than the known startup period of the motor during which the motor picks up speed before attaining a steady state speed. The speed at which the disk is to be read is then determined on the basis of the detected steady state speed of the motor.

The present invention as summarized above is based upon the discovery that disks with varying degrees of defects such as eccentricity and irregular weight distribution cause corresponding changes in the steady state speed of rotation of the disk drive motor: the poorer the disk quality, the lower the steady state speed. The steady state speed of the disk drive motor decreases when it is driving a poor quality disk, because of the loss of the kinetic energy of the motor due to the vibration of the disk and of the complete disk drive mechanism.

The checking of disk quality in terms of the steady state rotational speed of the motor offers the distinct advantage, over other possible methods of disk quality evaluation, that it requires no sensors or like expensive devices for measuring the variable, means for sensing the motor speed being preexistent in CD-ROM drives or like devices in which the inventive method is to be carried out.

Preferably, in consideration of possible fluctuations in supply voltage, the actual voltage that has been applied to the disk drive motor as it attains the steady state rotation may also be detected. A read speed for each disk may then be determined on the basis of the detected actual motor voltage in addition to the steady state speed of the motor. Still more accurate evaluation of disk quality will be possible in this manner.

In a preferred embodiment of the invention to be disclosed subsequently, disks are classified according to their qualities, as determined above, into either of three categories, good, intermediate, and poor. Good quality disks are read at twelve times the standard audio CD speed, intermediate quality disks at eight times that speed, and poor quality disks at four times that speed. Driven at the appropriate speeds, the disks will cause less vibration and, in consequence, less read errors and retries, thereby affording speedier reading.

It might be feared that read errors were averted at the sacrifice of disk speed. Such fears are unjustified. Experiment has proved that the errorless reading of poor and intermediate quality disks at the reduced speeds demands far less periods of time than higher speed reading of such disks which necessarily involves read errors and retries. The advantages of such reduced speed data recovery from disks of other than good quality will be even better appreciated by taking into consideration all the aforementioned difficulties accruing from the high speed reading of these disks.

According to a further feature of the present invention, the read speed that has been determined as above for each disk loaded into the apparatus is held until that disk is unloaded therefrom. Therefore, no matter how many times the disk is set into and out of rotation, the disk will be read at the same appropriate speed as along as it stays loaded in the apparatus.

The reduced speed driving of disks of other than good quality brings about an additional advantage of less vibration. In a computer system incorporating both CD-ROM drive and HDD the less vibration of the CD-ROM drive is very important because of the correspondingly less vibration of the HDD, which will therefore suffer less read and write errors.

The invention also concerns an apparatus for use in the practice of the disk check method summarized above. The method requires mostly only preexisting parts of an apparatus for reading a CD-ROM or like data storage disk, except perhaps a system controller constructed and programmed for carrying out the method.

The above and other objects, features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Apparatus

Figure 1:
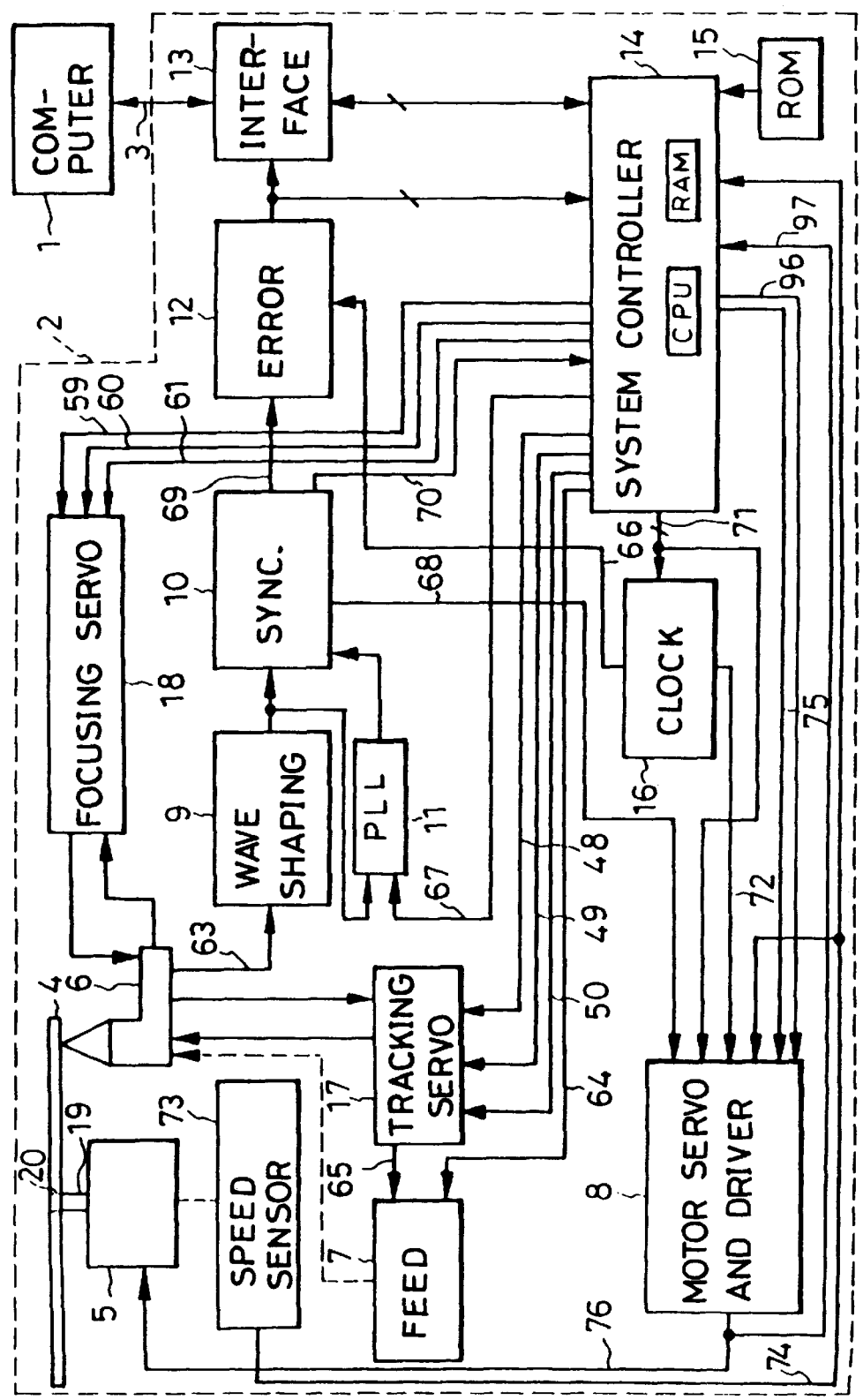
FIG. 1 is a block diagram of an example of CD-ROM drive constructed in accordance with the novel concepts of this invention, the CD-ROM drive being shown together with a computer with which it is incorporated.

The present invention is believed to be best embodied in the computer system diagramed in FIG. 1, which shows a computer 1 connected to a CD-ROM drive 2 by way of a bus 3. The CD-ROM drive 2 is shown loaded with a CD-ROM or optical data storage disk (hereinafter referred to simply as the disk) 4, which is disposed in position within the CD-ROM drive by receiving in its center hole 20 a drive spindle 19 shown as an armature shaft of an electric disk drive motor 5.

Other primary components of the CD-ROM drive 2 include an optoelectric transducer or pickup 6, a transducer feed means 7, a disk drive motor servo and driver circuit 8, a wave shaping circuit 9, a synchronization detector and demodulator circuit 10, a phase locked loop (PLL) circuit 11, an error detector and corrector circuit 12, an interface circuit 13, a system controller 14 in the form of a microprocessor with an external, programmable read-only memory (ROM) 15, a variable rate clock 16, a tracking servo circuit 17, and a focusing servo circuit 18. It is understood that the CD-ROM drive 2 is capable of data recovery at various speeds up to 12 times the standard audio CD speed in this particular embodiment.

Figure 2:
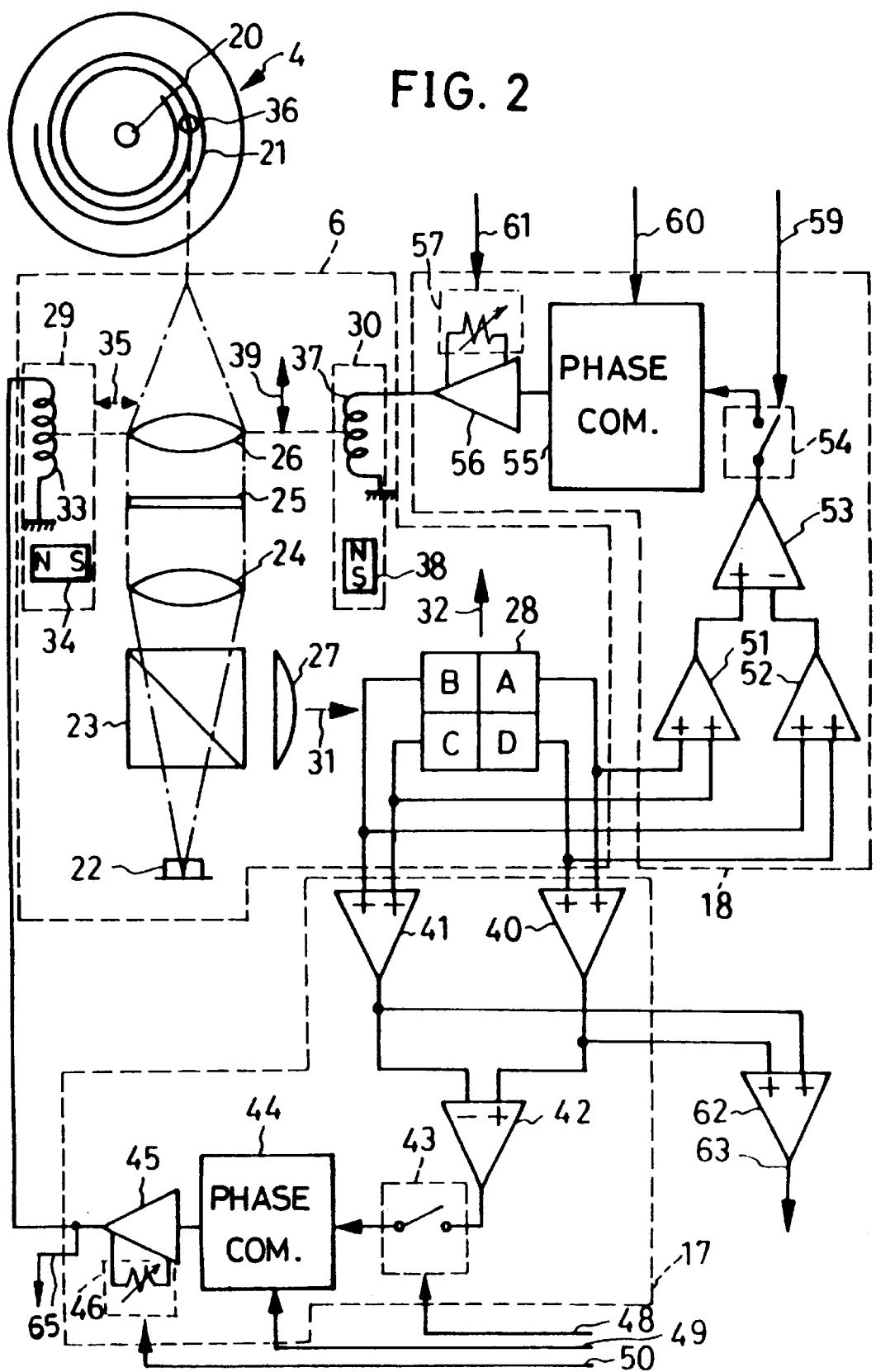
FIG. 2 is a schematic electrical diagram showing in more detail the transducer, tracking servo circuit, and focusing servo circuit of the FIG. 1 CD-ROM drive.

As depicted diagrammatically in FIG. 2, the disk 4 can be of the standard CD-ROM design having data prerecorded thereon in the form of optically detectable pits along a multiturn spiral track 21 centered about the hole 20. The data is conventionally prerecorded by being divided into a multiplicity of blocks each consisting of 2352 bytes, one byte being eight bits. Each data block is read in 1/75 second when the disk is read at the standard audio CD speed. In CD-ROMs, as in audio CDs, data is recorded, and read, at constant linear velocity (CLV), rather than at constant angular velocity (CAV), so that the angular velocity of the disk 4 is decreased as the transducer 6 scans the disk track 21 radially outwardly.

As shown in detail also in FIG. 2, the transducer 6 is of prior art design having a light source such as a diode laser 22, a beam splitter 23, a collimator lens 24 for providing parallel rays of light, a quarter wavelength plate 25, an objective lens 26, a semicylindrical lens 27 disposed on the path of the light beam that has been reflected back from the disk 4 and subsequently separated from the incident beam by the beam splitter 23, a quadruple photodetector 28, a tracking actuator 29, and a focusing actuator 30. The tracking actuator 29 and the focusing actuator 30 constitutes the final control elements of the tracking and the focusing servos, respectively, which are yet to be detailed.

Converged by the objective 26, the beam of light from the laser 22 will hit the surface of the disk 4. The unmodulated beam on hitting the disk surface will be modulated by the pattern of pits representative of data, and the thus modulated beam will be directed by the beam splitter 23 into the photodetector 28 via the semicylindrical lens 27. The modulated beam incident to the photodetector 28 is indicated by the arrow designated 31.

Capable of translating the incident light into electric signals, the photodetector 28 is shown to have a closely packed array of four sections designated A, B, C and D, not only for data recovery but for both focusing and tracking controls, too. The photodetector sections A and B, as well as the sections C and D, are so divided along a line extending essentially in the tangential direction of the disk track 21, as indicated by the arrow 32.

Contrary to the showing of FIG. 2, the familiar three spots method could be employed for data recovery and focusing and tracking controls. The beam from the laser 22 must be split into a primary beam and two auxiliary beams according to this prior art method. The primary beam is used for both data recovery and focusing, and the two auxiliary beams for tracking only. The photodetector 28 needs modification in this case to include two additional sections to be irradiated by the two tracking beams.

The tracking actuator 29 takes the form of a familiar voice coil device comprising a moving coil 33 coupled to the objective 26, and a permanent magnet 34. In response to bidirectional current flow therethrough, the moving coil 33 will move back and forth in the field of the magnet 34 parallel to the disk surface, as indicated by the double headed arrow 35. The objective 26 will move with the moving coil 33 radially of the disk 4 for maintaining the beam spot 36 in exact alignment with the spiral track 21 on the disk 4.

The tracking actuator 29 serves the additional purpose of jumping the beam spot to a desired track position during seek operations. Such spot jumping will take place as a jumping signal is applied from the system controller 14 to the tracking servo circuit 17.

Another possible method of tracking control is to provide a mirror on the path of the beam. Instead of moving the objective 26, this mirror may be pivoted back and forth so as to keep the beam spot aligned with the disk track.

The focusing actuator 30 is also shown as comprising a moving coil 37 and a permanent magnet 38. Coupled to the objective 26, the moving coil 37 is movable in the field of a permanent magnet 38. The objective 26 will move back and forth perpendicular to the disk surface, as indicated by the double headed arrow 39, in response to bidirectional current flow through the moving coil 37. The beam will thus be kept focused on the disk surface.

As shown also in FIG. 2, the noted four sections A–D of the photodetector 28 are all connected to the tracking servo circuit 17 and thence to the moving coil 33 of the tracking actuator 29 on one hand and, on the other hand, to the focusing servo circuit 18 and thence to the moving coil 37 of the focusing actuator 30. The tracking servo circuit 17 will first be described in detail, followed by the description of the focusing servo circuit 18.

The tracking servo circuit 17 comprises two adders 40 and 41, a subtracter 42, an on-off switch 43, a phase compensator circuit 44, a drive amplifier 45, and a gain select means 46.

The adder 40 adds together the outputs from the photodetector sections A and D, and the adder 41 the outputs from the other photodetector sections B and C. The subtracter 42 subtracts the output from the adder 41 from the output from the adder 40. The resulting output from the subtracter 42 is a tracking signal, which is applied to the moving coil 33 of the tracking actuator 29 via the on-off switch 43, phase compensator circuit 44, and drive amplifier 45, thereby causing the objective 26 to move parallel to the disk surface to keep the beam spot 36 in alignment with the disk track 21.

The above described method of obtaining the tracking signal from the four photodetector sections A–D is itself not new in the art but has been known as a differential phase detection method. The switch 43 for on-off control of the tracking servo is operated by a signal supplied from the system controller 14, FIG. 1, over a line 48. When the tracking servo is cut open, and when it is closed, will become apparent from the subsequent discussion of the inventive method.

The phase compensator circuit 44 is a known circuit comprising both a low pass filter and a high pass filter, with the filter constants changed by a signal fed from the system controller 14 over a line 49. Since the disk 4 is driven at CLV, with the disk speed changing with the radial position of the transducer on the disk, it is conventional in the art to vary the constants of the phase compensator circuit 44 accordingly.

Notwithstanding the showing of FIG. 2 the phase compensator circuit 44 could be connected between subtracter 42 and switch 43. Also, this figure does not show the automatic gain control circuit and the low pass filter which are customarily connected between subtracter 42 and phase compensator 44, because of their impertinence to the present invention.

It Is to be noted that the tracking servo circuit 17 includes the gain select means 46, shown as a variable resistor. The gain of this tracking servo is therefore variable under the control of a signal fed from the system controller 14 over a line 50. The system controller varies the tracking servo gain according to whether the disk is driven at the standard audio CD speed or at two, four, eight or twelve times that speed.

The focusing servo circuit 18 comprises two adders 51 and 52, a subtracter 53, an on-off switch 54, a phase compensator circuit 55, a drive amplifier 56, and a gain select means 57. The adder 51 adds together the outputs from the photodetector sections A and C, and the adder 52 the outputs from the other photodetector sections B and D. The subtracter 53 subtracts the output from the adder 52 from the output from the adder 51. The resulting output from the subtracter 53 is a focusing signal, which is applied to the moving coil 37 of the focusing actuator 30 via the on-off switch 54, phase compensator circuit 55, and drive amplifier 56, thereby causing the objective 26 to move toward and away from the disk 4 in order to hold the beam focused on the disk surface.

The above described method of obtaining the focusing signal from the four photodetector sections A–D is itself not new in the art but has been known as an astigmatic method. The switch 54 for on-off control of the focusing servo is turned on and off by a signal supplied from the system controller 14, FIG. 1, over a line 59.

Like its tracking servo counterpart 44, the phase compensator circuit 55 of the focusing servo circuit 18 is a known circuit comprising both a low pass filter and a high pass filter, with the filter constants changed by a signal fed from the system controller 14 over a line 60. This phase compensator circuit 55 could also be connected between subtracter 53 and switch 54 instead of on the output side of the switch 54. The standard automatic gain control circuit and low pass filter are not shown in the focusing servo circuit 18, either, because of their impertinence.

It will be noted that the focusing servo circuit 18 includes the gain select means 57, too. The gain of the focusing servo is therefore variable under the control of a signal fed from the system controller 14 over a line 61. The system controller varies the focusing servo gain according to whether the disk is driven at the standard audio CD speed or at two, four, eight or twelve times that speed.

With continued reference to FIG. 2 the outputs from all the photodetector sections A–D may be combined to provide a read signal representative of the data recovered from the disk 4. In the illustrated embodiment a two inputs adder 62 is provided for adding together the outputs from the two adders 40 and 41 of the tracking servo circuit 18. The read signal thus obtained is sent over a line 63 to the wave shaping circuit 9, FIG. 1. It is self evident that the adder 62 could be connected to the outputs of the adders 51 and 52 of the focusing servo circuit 18, or a four inputs adder could be employed for direct connection to the four photodetector sections. All or some of the adders 40, 41, 51, 52 and 62 and subtracters 42 and 53 could be parts of the transducer 6.

With reference back to FIG. 1 the transducer 6 is moved radially of the disk 4 by the feed means 7 typically comprising an electric motor and means such as a lead screw or a rack and pinion mechanism for translating the bidirectional rotation of the motor into the linear reciprocation of the transducer 6. The feed means 7 functions to move the transducer 6 to a desired track position across the track turns on the disk 4 in response to a seek command sent from the system controller 14 over a line 64. Additionally, the feed means 7 includes a low pass filter for deriving from the tracking signal fed from the tracking servo circuit 17 over a line 65, the signal component indicative of the translation of the beam spot 36 radially of the disk 4. The feed means 7 thus enables the transducer 6 to trace the spiral track 21 in cooperation with the disk drive motor 5.

The wave shaping circuit 9 amplifies the radio frequency read signal from the transducer 6 and reshapes it into a binary signal. It is understood that the disk 4 carries data encoded by the well known eight to fourteen modulation (EFM) method. The output from the wave shaping circuit 9 is therefore an EFM signal if the data is correctly retrieved from the disk.

The wave shaping circuit 9 has its output connected to both synchronization detector and demodulator circuit 10 and phase locked loop (PLL) circuit 11. The PLL circuit 11 provides clock pulses in synchronism with the bits of the EFM signal from the wave shaping circuit 9. The clock pulses put out by the PLL circuit 11 will be hereinafter referred to as the read clock pulses. The PLL circuit 11 has another input connected by way of a line 67 to the system controller 14 whereby the central frequency of a voltage controlled oscillator, not shown, included in the PLL circuit is to be changed.

The PLL circuit 11 has its output connected to the synchronization detector and demodulator circuit 10, which operates to determine whether or not the PLL circuit is locked, that is, operating in synchronism with the EFM signal. If it is, then, the circuit 10 will pass the read clock pulses from the PLL circuit 11 on to the disk drive motor servo and driver circuit 8 by way of a line 68. Also, when the PLL circuit 11 is found locked, the synchronization detector and demodulator circuit 10 will use the read clock pulses to demodulate the EFM signal into, for example, a digital non-return-to-zero (NRZ) signal, preparatory to delivery to the error detector and corrector circuit 12 over a line 69. The synchronization detector and demodulator circuit 10 performs the additional function of demodulating the recovered addresses of the data blocks on the disk 4, for delivery to the system controller 14 over a line 70. The system controller 14 conventionally utilizes the block addresses for causing the transducer 6 to be positioned over any desired data blocks on the disk 4.

The error detector and corrector circuit 12 detects errors, if any, in the incoming NRZ signal, corrects them if possible, and causes reading to be retried if correction is impossible. The output of the error detector and corrector circuit 12 is connected to both interface circuit 13 and system controller 14. The interface circuit 13 is connected between computer 1 and system controller 14, as well as between computer 1 and error detector and corrector circuit 12.

The variable rate clock 16 is connected to the system controller 14 by way of a speed data bus 71, to the motor servo and driver circuit 8 by way of a line 72, and to the error detector and corrector circuit 12 by way of a line 66. The speed data sent from system controller 14 to clock 16 over the bus 71 indicates one of the several predetermined speeds at which the disk 4 is to be driven by the motor 5. In response to the speed data the clock 16 generates pulses at either of a standard repetition rate, corresponding to the standard audio CD speed, and two, four, eight, and twelve times the standard rate. The pulses produced by the clock 16 will be referred to as the true clock pulses in contradistinction from the read clock pulses put out by the PLL circuit 11. The true clock pulses are delivered to the motor servo and driver circuit 8 by way of the line 72 and to the error detector and corrector circuit 12 by way of the line 66.

The motor servo and driver circuit 8 has connected thereto the synchronization detector and demodulator circuit 10 by way of the read clock pulse line 68, the system controller 14 by way of the bus 71 and lines 75 and 96, the clock 16 by way of the line 72, and a motor speed sensor 73 by way of a line 74. The output of the motor servo and driver circuit 8 is connected to the disk drive motor 5 by way of a line 76. The system controller 14 has an input connected by way of a line 97 to the output line 76 of the motor servo and driver circuit 8 for sensing the voltage on the disk drive motor 5.

Mechanically coupled to the disk drive motor 5, the motor speed sensor 73 generates pulses at a rate proportional to the rotational speed of the motor and hence of the disk 4. Six motor speed pulses are generated with each complete revolution of the motor in this particular embodiment. Besides being connected to the motor servo and driver circuit 8, the motor speed sensor 73 is coupled to the system controller 14 in order to enable the same to know the rotational speed of the disk in real time.

Figure 3:
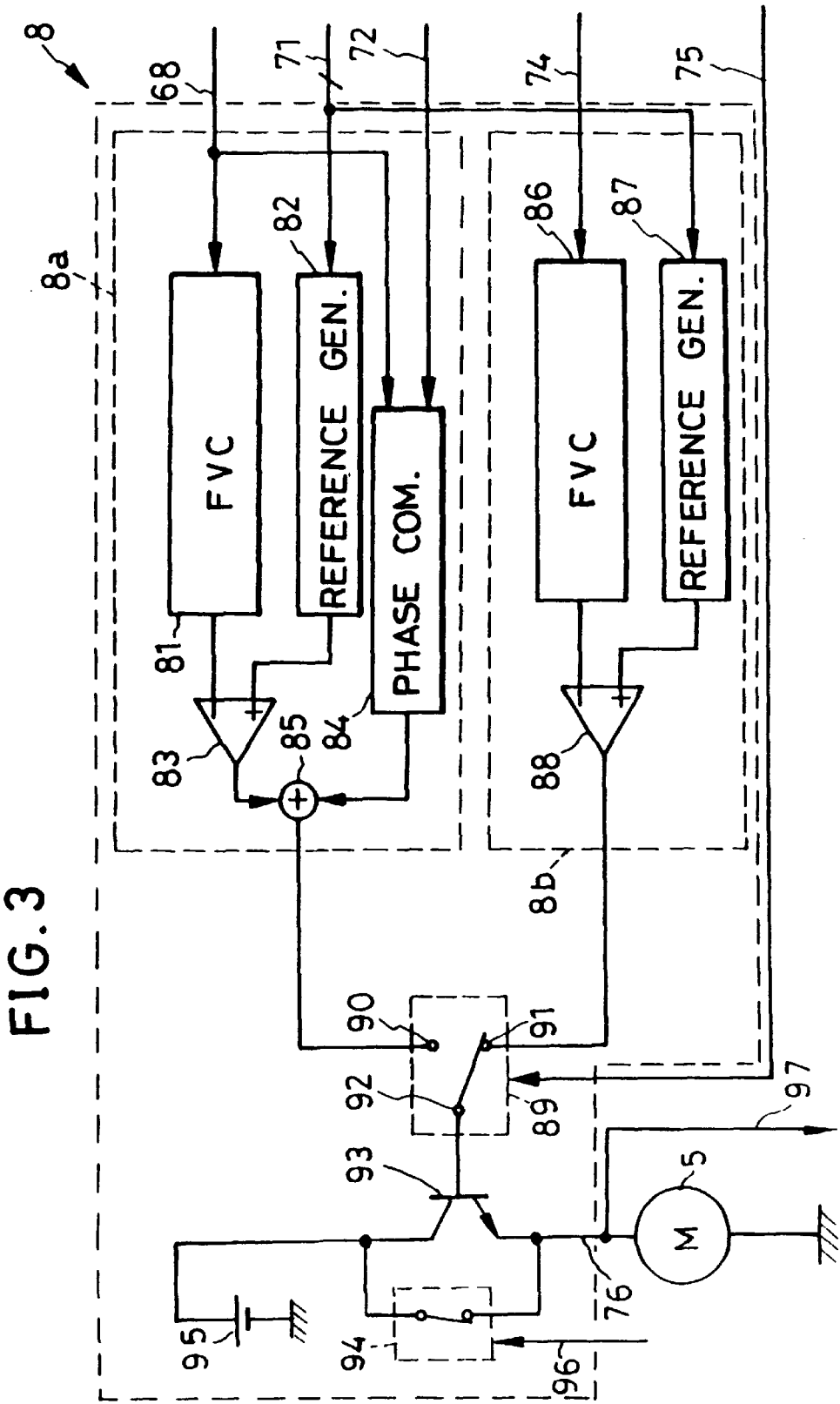
FIG. 3 is a schematic electrical diagram showing in more detail the disk drive motor servo and driver circuit included in the FIG. 1 CD-ROM drive.

As illustrated in detail in FIG. 3, the motor servo and driver circuit 8 comprises a CLV servo circuit 8a for CLV driving of the disk drive motor 5, and a CAV servo circuit 8b for CAV driving of that motor. The CLV servo circuit 8a includes a frequency to voltage converter (FVC) 81 having an input connected to the read clock pulse line 68 for converting the repetition rate of the read clock pulses into an equivalent voltage signal. The output of the FVC 81 is connected to one input of a differential amplifier 83.

Connected to another input of the differential amplifier 83 is a reference voltage generator 82 which puts out a selected one of five different reference voltages corresponding respectively to a predetermined minimum disk rotation speed, which in this particular embodiment is the standard audio CD speed, and two, four, eight, and twelve times the minimum speed, in response to the speed data sent from the system controller 14 over the bus 71. Thus the differential amplifier 83 puts out a voltage signal indicative of the difference between the selected reference voltage and the FVC output voltage representative of the read clock pulse rate.

A further member of the CLV servo circuit 8a is a phase comparator 84 having an input connected to the read clock pulse line 68, and another input to the true clock pulse line 72. The output from the phase comparator 84 is therefore indicative of the phase departure of the read clock pulses from the true clock pulses.

The differential amplifier 83 and the phase comparator 84 are both connected to an adder 85, an additional component of the CLV circuit 8a. The output from the adder 85 is the sum of the repetition rate difference signal from the differential amplifier 83 and the phase difference signal from the phase comparator 84. This output from the adder 85 is therefore termed a total difference signal.

The CAV servo circuit 8b likewise comprises an FVC 86 and a reference voltage generator 87, both connected to the inputs of a differential amplifier 88. Connected to the output line 74 of the motor speed sensor 73, the FVC 86 provides a voltage proportional to the repetition rate of the motor speed pulses, that if, to the rotational speed of the disk drive motor 5. Like its counterpart in the CLV servo circuit 8a, the reference voltage generator 87 has its input connected to the speed data bus 71 for putting out a reference voltage corresponding to the speed specified by the system controller 14. The differential amplifier 88 provides a voltage proportional to the difference between the outputs from the FVC 86 and the reference voltage generator 87.

The motor servo and driver circuit 8 is further provided with a selector switch 89 for selectively putting out the CLV and the CAV control signals produced by the circuits 8a and 8b. The selector switch 89 is shown to comprise a fixed contact 90 connected to the adder 85 of the CLV servo circuit 8a, another fixed contact 91 connected to the differential amplifier 88 of the CAV servo circuit 8b, and a movable contact 92 connected to the disk drive motor 5 via a transistor 93. The movable contact 92 is engageable with either of the two fixed contacts 90 and 91 in response to a CAV/CLV select signal sent from the system controller 14 over the line 75.

Connected between disk drive motor 5 and direct current power supply 95, the transistor 93 permits the motor to be driven from the power supply as dictated by the signal applied to its base from either CLV servo circuit 8a or CAV servo circuit 8b. Further, according to the instant invention, an on-off switch 94 is connected in parallel with the transistor 93. Itself a transistor or like semiconductor device, the switch 94 causes the motor 5 to be driven at full supply voltage. The system controller 14 is connected by way of the line 96 to the switch 94 for its on-off control.

The system controller 14, FIG. 1, can take the form of a microprocessor of conventional design comprising a central processor unit (CPU) 81 and a random access memory. The external ROM 15 is shown connected to the controller 14. The ROM 15 may be factory preprogrammed to enable the controller 14 to perform various operations automatically. The programs on the ROM 15 include a disk check program in accordance with the method of the present invention. The disk check program dictates a sequence of steps to be followed for determining a read speed suiting each loaded disk according to its physical quality as detected from the speed at which the disk drive motor levels off when driven at full supply voltage, as will be detailed presently.

Figure 4:
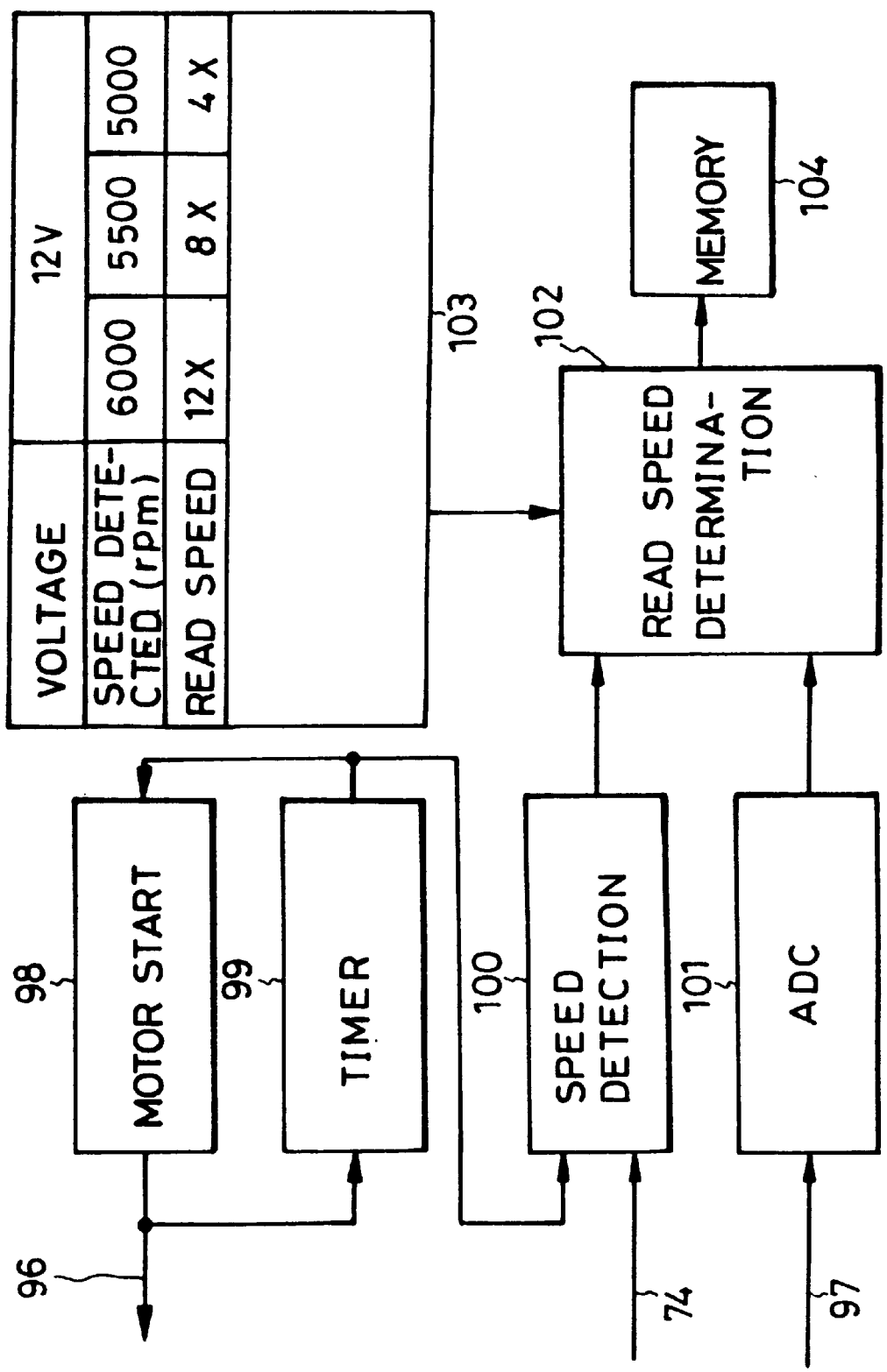
FIG. 4 is an equivalent block diagram of the system controller included in the FIG. 1 CD-ROM drive, showing in particular means possessed by the system controller in regard to the implementation of the disk check method according to the present invention.

Block diagrammatically illustrated in FIG. 4 are some of the means that may be considered equivalently included in the system controller 14 for performing the disk check program according to the invention. At 98 is shown a means for generating a motor start signal for the disk check program as shortly as possible after the loading of a disk in the disk drive 2 and in the absence of access commands from the computer. The motor start signal is sent over the line 96 to the switch 94, FIG. 3, of the motor servo and driver circuit 8 in order to cause the disk drive motor 5 to be driven from the power supply 95 at its full voltage.

The direct driving of the motor 5 from the power supply 95 is to be continued for a prescribed length of time, which is ten seconds in this particular embodiment. A timer 99 is connected across the motor start signal generating means 98 for measuring that prescribed ten seconds following the startup of the motor.

Connected to the motor speed sensor 73 by way of the line 74, a speed detecting means 100 counts the motor speed pulses at constant time intervals. The timer 99 is also connected to this speed detecting means 100 to inform the same of the termination of the prescribed ten seconds following the motor startup. The speed detecting means 100 notifies a read speed determination means 102 of the rotational speed of the disk drive motor 5 at the moment of the expiration of ten seconds.

An analog to digital converter 101 digitizes the motor drive voltage being applied from the motor servo and driver circuit 8 to the disk drive motor 5, although this ADC could be external to the system controller 14. The digitized motor drive voltage is delivered to the read speed determination means 102. Evaluating the disk quality on the bases of the motor speed upon lapse of ten seconds following its startup and of the motor drive voltage, the read speed determination means 102 determines the speed at which the disk is to be read, by referring to a table 103 stored in the system controller 14.

Although the table as given in FIG. 4 is incomplete, it will nevertheless be seen that the table lists a plurality of, three in this embodiment, optimum disk read speeds that have been predetermined according to the motor drive voltages and motor speeds explained above. The optimum read speed is twelve times the standard audio CD speed if the detected motor drive voltage is twelve volts, and the detected motor speed 6000 revolutions per minute; eight times the standard audio CD speed if the detected motor drive voltage is twelve volts, and the detected motor speed 5500 rpm; and four times the standard audio CD speed if the detected motor drive voltage is twelve volts, and the detected motor speed 5000 rpm.

It is understood that the table 103 additionally includes combinations of other motor drive voltages, such as 13.2 volts, 12.6 volts, 11.4 volts, 10.8 volts and so forth, and motor speeds, and the optimum read speeds for such combinations of variables. Such tabulated data have been amassed from experimentation of many commercially available disks. However, in the practice of the instant invention, disks may inevitably be encountered for which no exact combinations of motor drive voltage and motor speed are listed in the table 103. The read speed determination means 102 will then determine a read speed for each such disk from the closest combination. The read speed thus determined for each loaded disk is held in a memory 104 until the disk is unloaded.

Method

Figure 5:
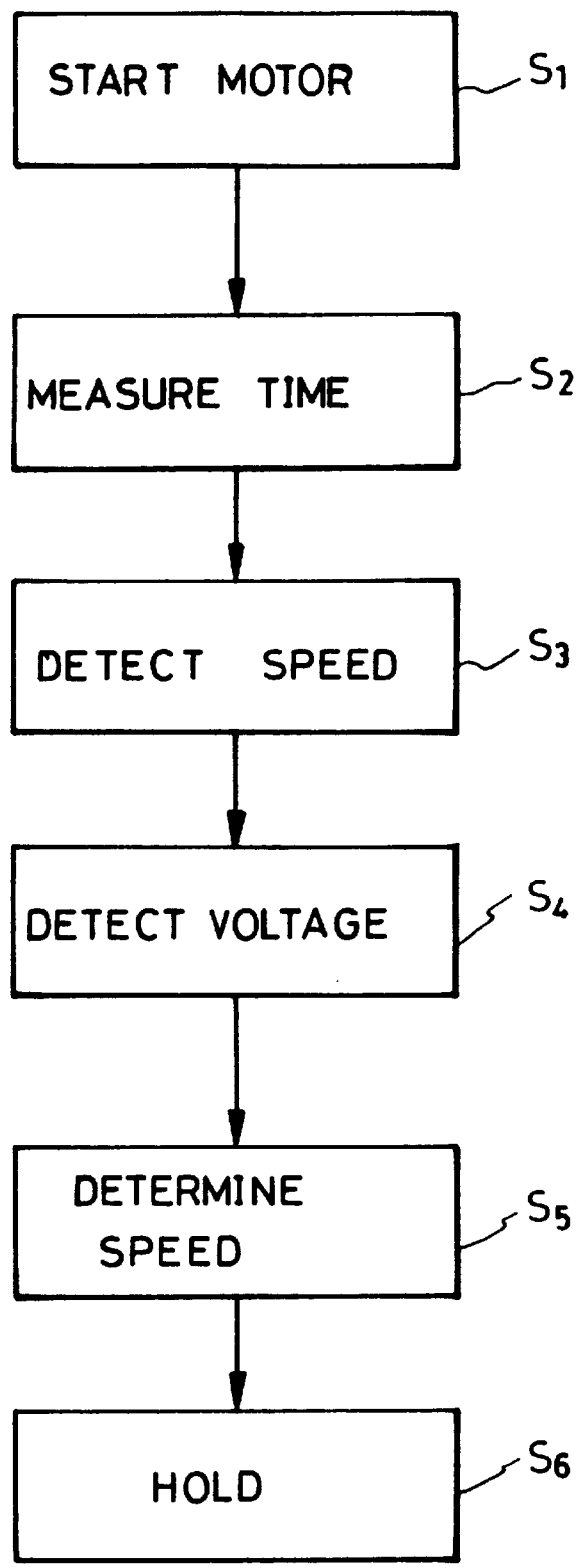
FIG. 5 is a flow chart of the disk check method according to the present invention, to be practiced in the FIG. 1 CD-ROM drive.
Figure 6:
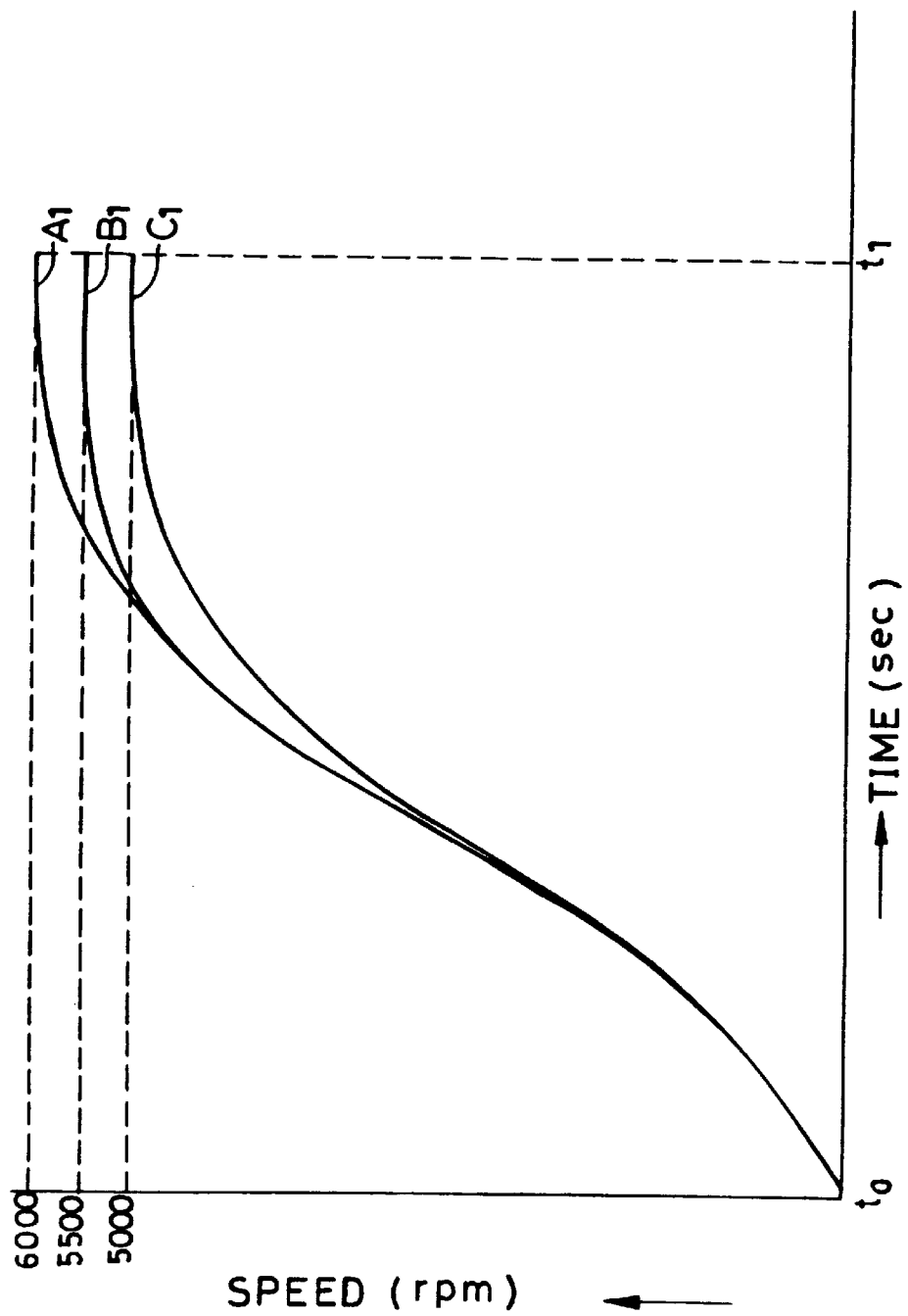
FIG. 6 is a graph explanatory of how the disk drive motor picks up speed and attains different steady state speeds according to the qualities of disks being driven.

The disk check method according to the invention will be best understood from a study of the flow chart of FIG. 5. At an appropriate moment after a disk has been loaded on the drive spindle 19, preferably upon lapse of a preassigned period time following the latest access command from the computer 1, the disk drive motor 5 may be started up according to a block $S_1$. To this end the system controller 14 will deliver a switch control signal to the disk check switch 94, FIG. 3, over the line 96. The motor 5 will then be energized from the power supply 95 at its full voltage. FIG. 6 graphically indicates how the disk drive motor 5, energized at the full supply voltage as above, picks up speed and attains steady state rotation.

The next block $S_2$ dictates the measurement of a preassigned period of time that is not less, preferably somewhat more, than the time, called the startup period, required for the motor to reach a steady state after being started up at $t_0$ in FIG. 6. The preassigned period of time is from $t_0$ to $t_1$ in FIG. 6. This measurement is done by the timer 99, FIG. 4, of the system controller 14.

Then, upon lapse of the preassigned period of time $t_0$–$t_1$, the rotational speed of the motor 5, now in a steady state, is detected by the speed detecting means 100 according to a block $S_3$. The detected steady state motor speed is sent to the read speed determination means 102.

The disk drive motor 5 would be in rotation at the same steady state speed at the time $t_1$ if all the disks checked were of the same quality, totally free from eccentricity or uneven weight distributions. Actually, however, disks do fluctuate in quality, and they cause the motor 5 to gain a steady state at different speeds even when driven at exactly the same voltage.

The curves $A_1$, $B_1$ and $C_1$ of FIG. 6 represent the speed-time characteristics exhibited by three different disks commercially available today. The steady state motor speeds detected for the disks at the time $t_1$ are indicated to be 6000, 5500, and 5000 rpm, respectively. The curve $A_1$ represents a high quality disk, with little or no eccentricity or weight irregularity; the curve $B_1$ an intermediate quality disk, with some eccentricity or weight irregularity; and the curve $C_1$ a poor quality disk, with more eccentricity or weight irregularity. Disks of other than good quality will more or less wobble or otherwise vibrate when rotated at speeds several times as high as the standard audio CD speed, causing the disk drive mechanism and other parts of the disk drive to vibrate, too. Such vibrations represent a loss of the kinetic energy of the motor. Consequently, the poorer the disk quality, the lower is the speed at which the motor attains a steady state.

The next block $S_4$ indicates the detection of the voltage on the motor 5. The motor drive voltage is detected digitally by the ADC 101, FIG. 4, for delivery to the read speed determination means 102. However, this motor drive voltage could be detected before the motor speed detection of the block $S_3$, all that is required being that the voltage be ascertained at which the motor has been energized during the $t_0$–$t_1$ time interval.

Then comes a block $S_5$ which indicates the determination of the speed at which the disk in question is to be read. To this end the read speed determination means 102 refers both the steady state motor speed detected at the block $S_3$ and the motor drive voltage detected at the block $S_4$ to the table 103, FIG. 4, and thus chooses the corresponding read speed. For example, if the steady state motor speed is 6000 rpm, and the motor drive voltage 12 V, the determination means will choose the read speed of 12 times the standard audio CD speed for this good quality disk.

The read speed thus determined is held in the memory 104 according to a block $S_6$ until the disk is unloaded from the device 2. This disk will therefore be read at the same optimum speed no matter how many times it is accessed before being withdrawn.

Second Form

Figure 7:
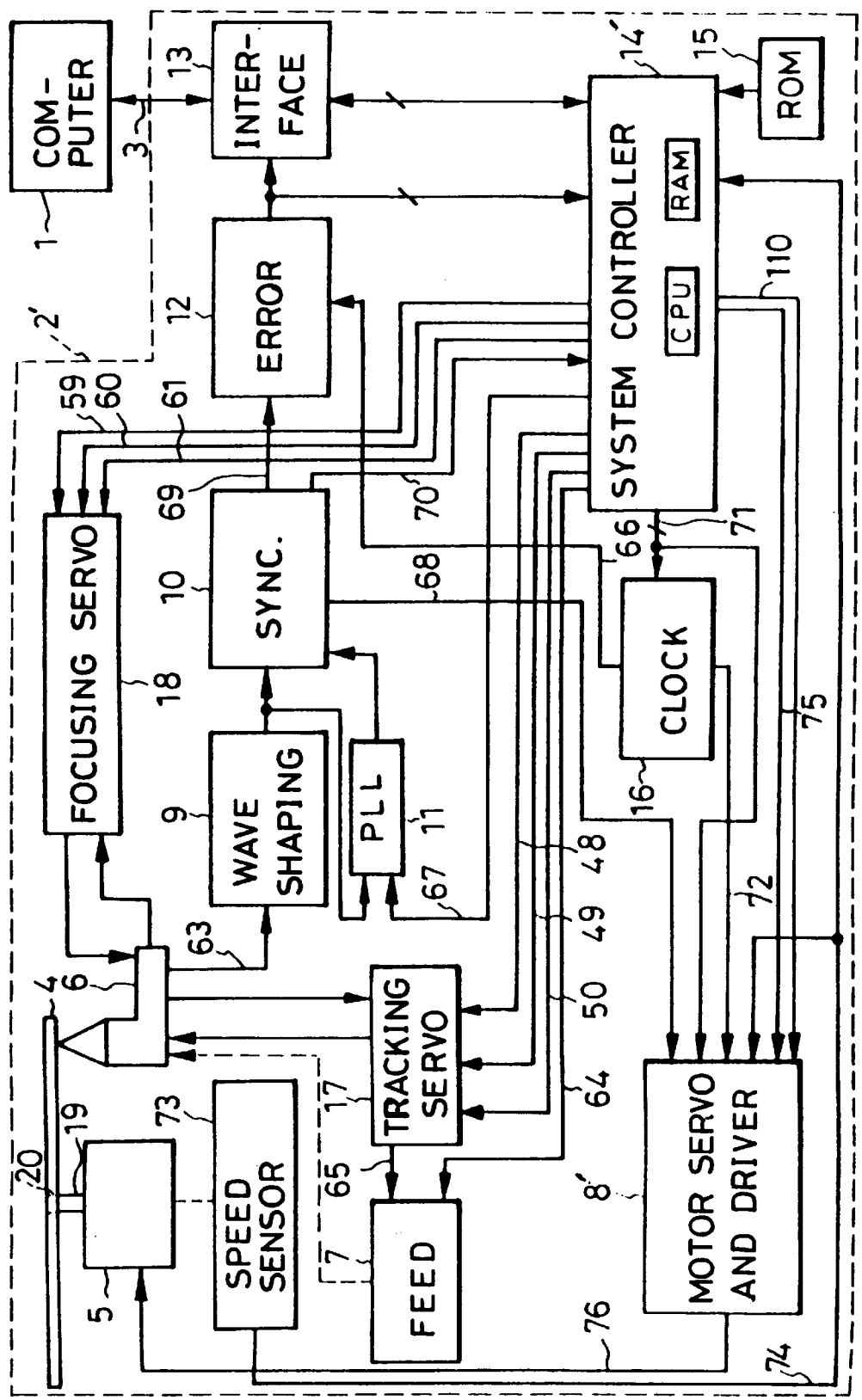
FIG. 7 is a block diagram similar to FIG. 1 but showing a slightly modified CD-ROM drive for the practice of an alternate disk check method according to the present invention.

FIG. 7 shows a modified CD-ROM drive 2' which differs from the FIG. 1 device 2 only in a motor servo and driver circuit 8' and a system controller 14'. The motor servo and driver circuit 8' is shown in detail in FIG. 8, and the system controller 14' in FIG. 9.

Figure 8:
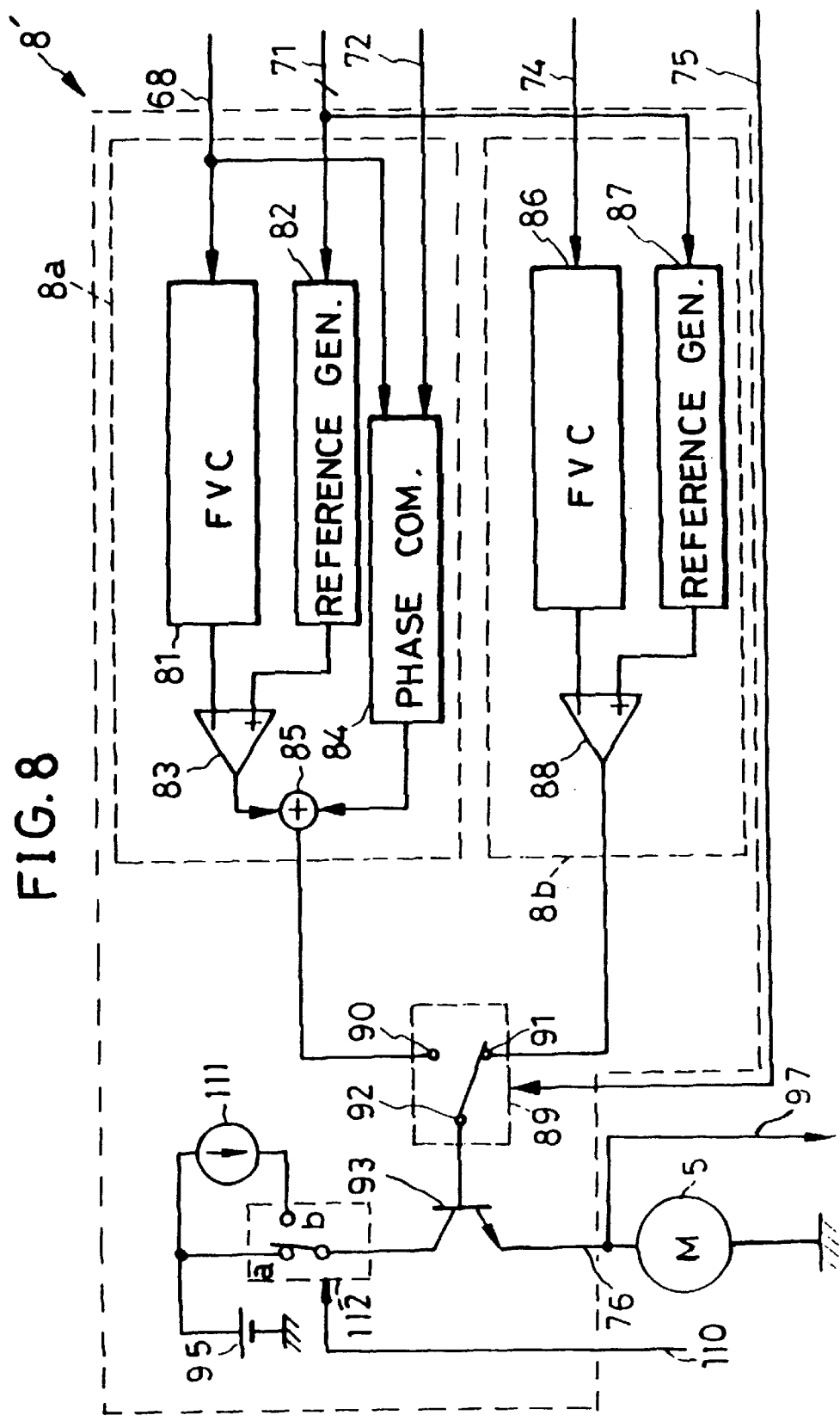
FIG. 8 is a schematic electrical diagram showing in more detail the disk drive motor servo and driver circuit included in the FIG. 7 CD-ROM drive.

With reference to FIG. 8 the motor servo and driver circuit 8' differs from its FIG. 3 counterpart 8 only in having a current regulator circuit 111 and a selector switch 112 instead of the on-off switch 94. Operated by a signal supplied from the system controller 14' over a line 110, the selector switch 112 functions to connect the power supply 95 to the disk drive motor 5 either directly or via the current regulator circuit 111.

Figure 9:
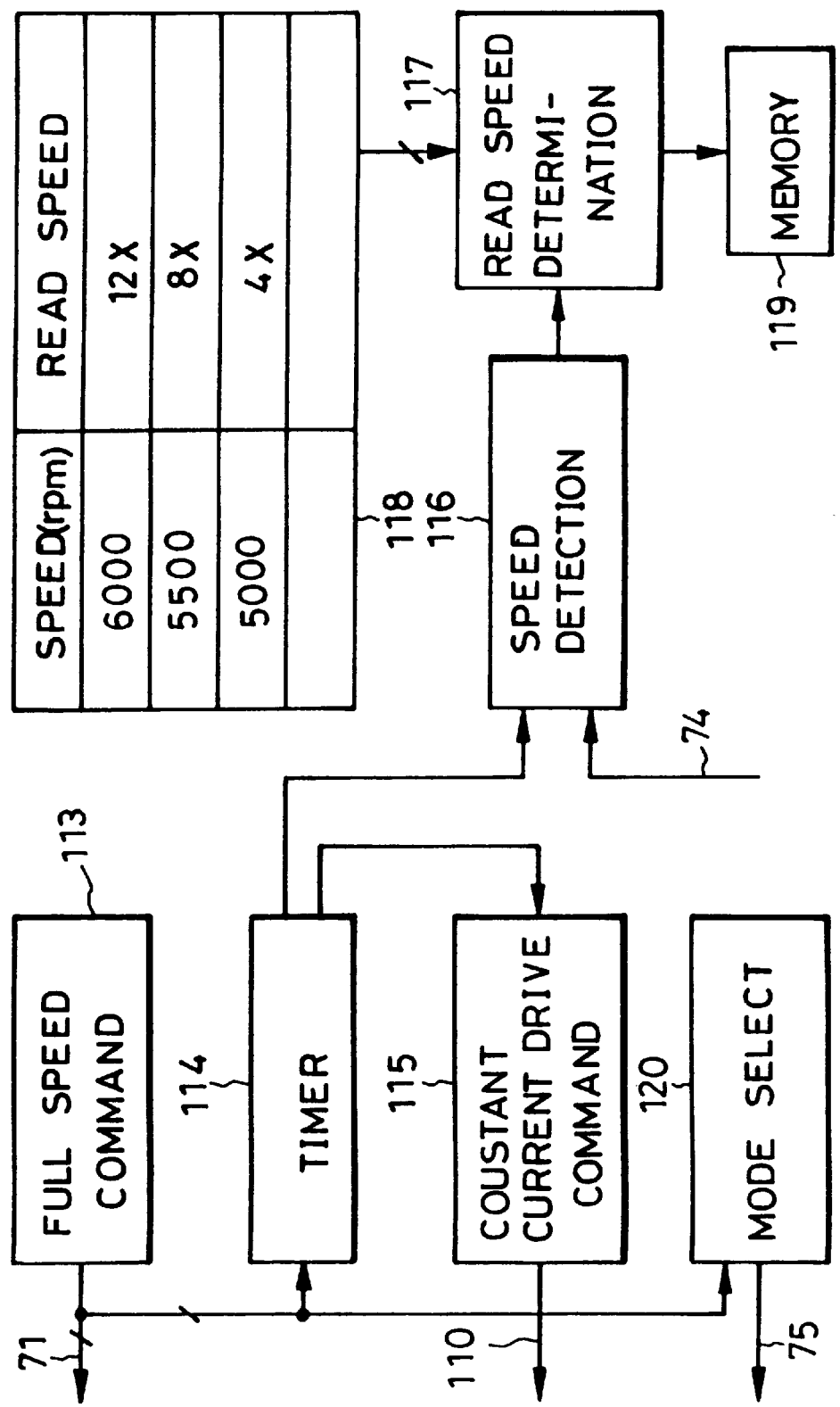
FIG. 9 is a block diagram similar to FIG. 4 but showing the system controller of the FIG. 7 CD-ROM drive, particularly in regard to the alternate disk check method.

As far as the disk check method of this invention is concerned, the system controller 14' should be configured as schematically depicted in FIG. 9. It includes a full speed commanding means 113 which puts out speed data indicative of the full speed (e.g. twelve times the standard audio CD speed) rotation of the disk drive motor 5 in response to the loading of a disk on the drive spindle 19. The speed data is sent over the bus 71 to both the clock 16, FIG. 7, and the reference voltage generator 87, FIG. 8, of the CAV servo circuit 8b of the motor servo and driver circuit 8'.

The speed data is also directed into a mode select means 120, FIG. 9, in order to inform the same of the full speed driving of the motor 5 for disk checking. So informed, the mode select means 120 will respond by putting out a switch control signal which is sent over the line 75 to the selector switch 89, FIG. 8, for connecting the CAV servo circuit 8b to the base of the transistor 93.

Figure 11:
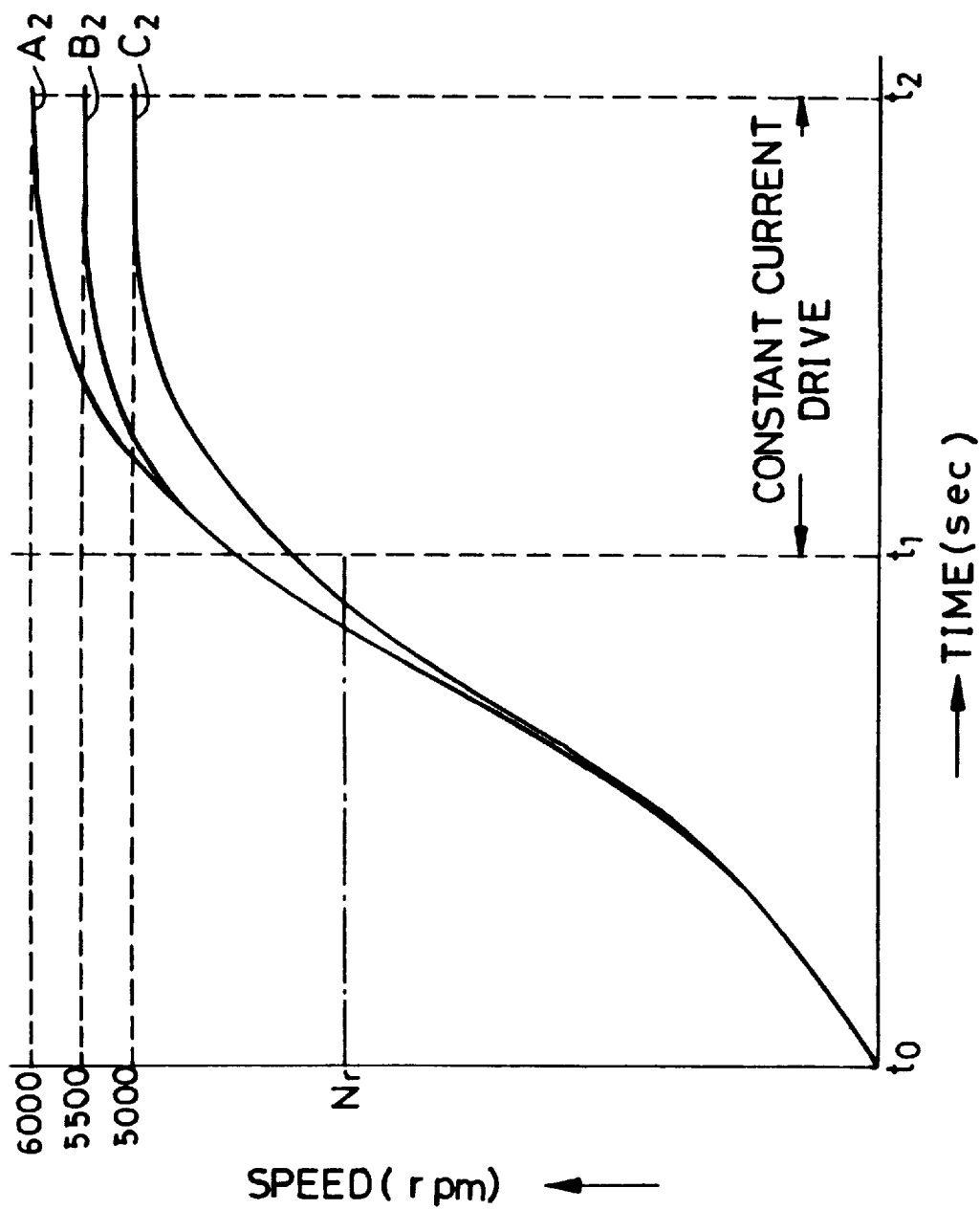
FIG. 11 is a graph explanatory of how disk quality is evaluated by the alternate disk check method.

Also triggered by the speed data from the full speed rotation commanding means 113, a timer 114 measures the $t_0$–$t_1$ and $t_1$–$t_2$ time intervals of FIG. 11. The first time interval $t_0$–$t_1$ is that normally required for the motor to pick up speed to a predetermined level (e.g. eight times the standard audio CD speed) which is less than the full speed of twelve times the standard audio CD speed. The second time interval $t_1$–$t_2$ is not less than the time required for the motor to increase speed from eight to twelve times the standard audio CD speed and further to gain a steady state at that full speed. The motor speed will rise more or less like the curves of FIG. 11 when the CAV servo circuit 8b, FIG. 8, of the motor servo and driver circuit 8' is commanded at $t_0$ to drive the motor at full speed. Initially, the detected actual motor speed will be so much less than the required speed that a correspondingly high supply voltage will be applied to the motor thereby causing the same to pick up speed rapidly.

The driving of the motor from the CAV servo circuit 8b during the first time interval $t_0$–$t_1$ is not essential. An obvious alternative is to close the switch 94, FIG. 3, or to saturate the transistor 93.

The timer 114 is connected to a constant current drive commanding means 115 to inform the same of the expiration of the first time interval $t_0$–$t_1$. So informed, the commanding means 115 responds by sending a signal over the line 110 to the switch 112, FIG. 8, of the motor servo and driver circuit 8', causing the motor 5 to be driven via the current regulator circuit 111.

During the ensuing second time interval $t_1$–$t_2$, which may be two seconds or so, a constant current of as low magnitude as, say, 300 milliamperes is fed to the motor 5. This current magnitude is a minimum required to keep a good quality disk in steady state rotation at the maximum speed of twelve times the standard audio CD speed after the startup period.

Despite the change to the constant current driving at $t_1$ the motor 5 will continue to pick up speed by inertia, having been sufficiently accelerated from $t_0$ to $t_1$. Eventually, if the disk is of good quality, the motor speed will reach the maximum of 6000 rpm and be maintained at that level by the constant current driving, like the curve $A_2$. If the disk is of poor or intermediate quality, however, the motor will fail to achieve the maximum speed by being driven at the constant current, like the curves $B_2$ and $C_2$. The failure is due to energy loss through vibration, as has been set forth in connection with the first disclosed embodiment. Contrary to the showings of FIG. 11, the motor may attain the steady states after overshoots.

The system controller of FIG. 9 is shown to additionally comprise a speed detecting means 116 having an input connected to the timer 114, and another to the motor speed sensor 74 by way of the line 74. Thus the speed detecting means 116 is enabled to ascertain the actual speed of the motor 5 at $t_2$ when the motor gains a steady state.

Inputting the steady state motor speed signal from the speed detecting means 116, a read speed determination means 117 determines the read speed for the disk by referring the steady state motor speed to a table 118 on a ROM. This table specifies predetermined read speeds for various steady state motor speeds, for example, a read speed of twelve times the standard audio CD speed for the steady state motor speed of 6000 rpm, eight times the standard audio CD speed for 5500 rpm, and four times the standard audio CD speed for 5000 rpm. A read speed is chosen from that one of the listed steady state motor speeds which is closest to the detected steady state motor speed.

Instead of such a table, however, a read speed may be determined by computation, for example, a read speed of eight times the standard audio CD speed if the steady state motor speed is five percent less than the maximum, a read speed of four times the standard audio CD speed if the steady state motor speed is ten percent less than the maximum, and so forth. Either way, the read speed determined by the means 117 is held in a memory 119 until the disk is unloaded.

Figure 10:
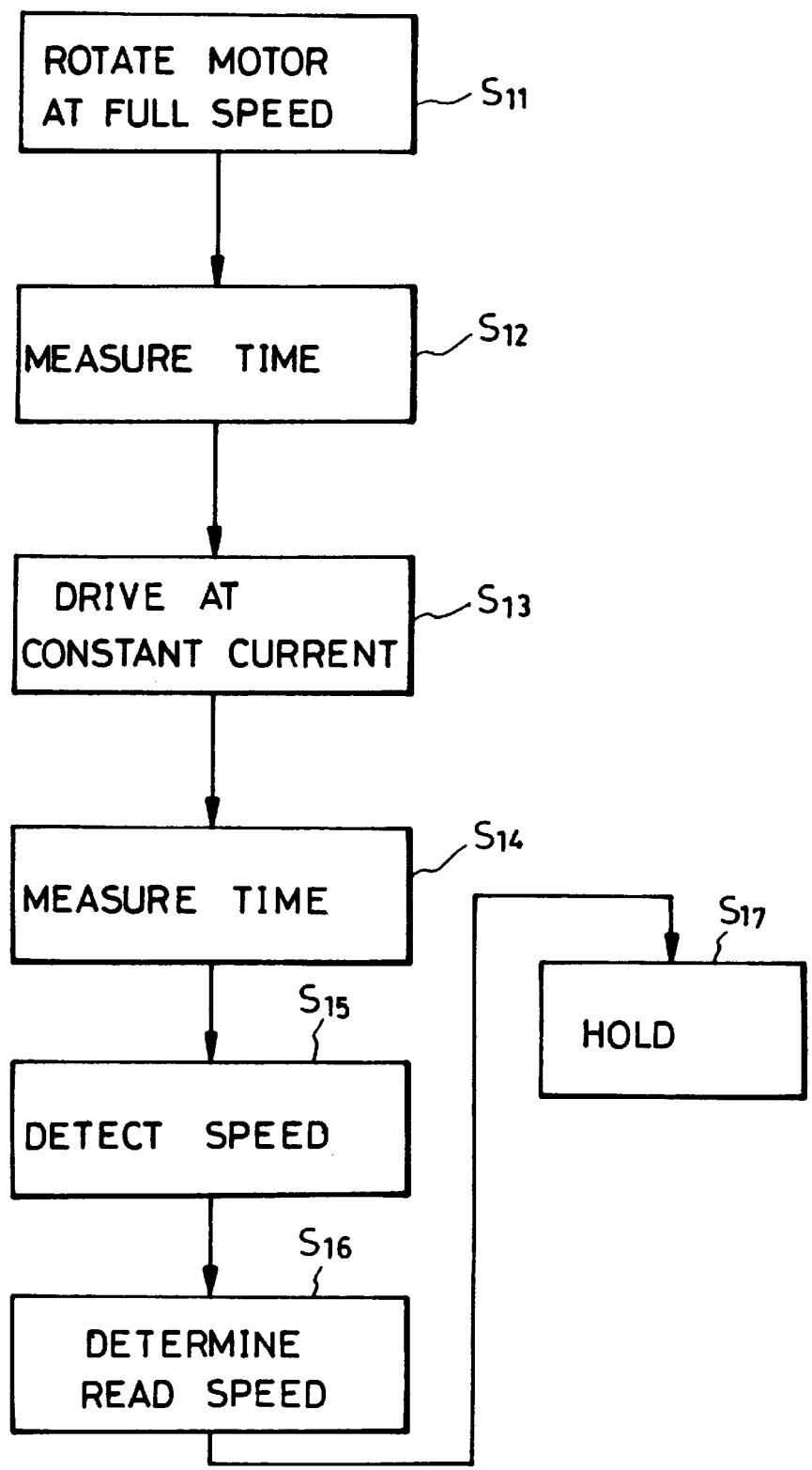
FIG. 10 is a flow chart of the alternate disk check method according to the present invention.

The foregoing alternate disk check method will be better understood by referring to the flow chart of FIG. 10. The full speed rotation of the disk drive motor 5 is commanded by the means 13, FIG. 9, at a block $S_{11}$ in response to the loading of a disk on the drive spindle. The next block $S_{12}$ indicates the measurement of the first time interval $t_0$–$t_1$ by the timer 114, upon lapse of which time interval the switch 112, FIG. 8 is actuated by a signal from the constant current drive commanding means 15 to cause the motor 5 to be driven from the current regulator 111 according to a block $S_{13}$.

The next block $S_{14}$ again indicates the measurement of time by the timer 114, this time from $t_1$ to $t_2$, at which latter moment the motor speed is assumed to achieve a steady state. This steady state motor speed is then detected by the means 116 according to a block $S_{15}$, and from this detected speed a read speed for the disk is determined by the means 117 according to a block $S_{16}$ and stored in the memory 119.

It is self evident that this alternate embodiment of the invention gains the same advantages as does the first disclosed embodiment.

Possible Modifications

Figure 12:
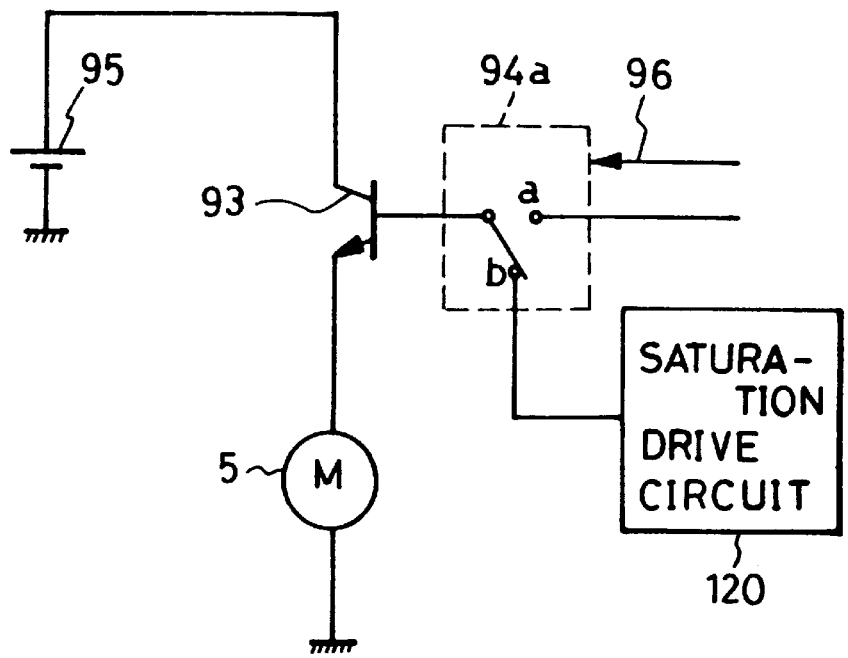
FIG. 12 is a schematic electrical diagram of a modified motor driver circuit according to the present invention.

Notwithstanding the foregoing detailed disclosure it is not desired that the present invention be limited by the exact showing of the drawings or the description thereof; rather, the invention should be construed broadly and in a manner consistent with the fair meaning or proper scope of the attached claims. The following is a brief list of possible modifications of the illustrated embodiment which are all believed to fall within the scope of the invention:

1. The switch 94, FIG. 3, of the motor servo and driver circuit 8 could be replaced by a saturation drive circuit 120, FIG. 12, which is to be connected to the base of the transistor 93 via a switch 94a during the $t_0$–$t_1$ period of FIG. 6.

Figure 13:
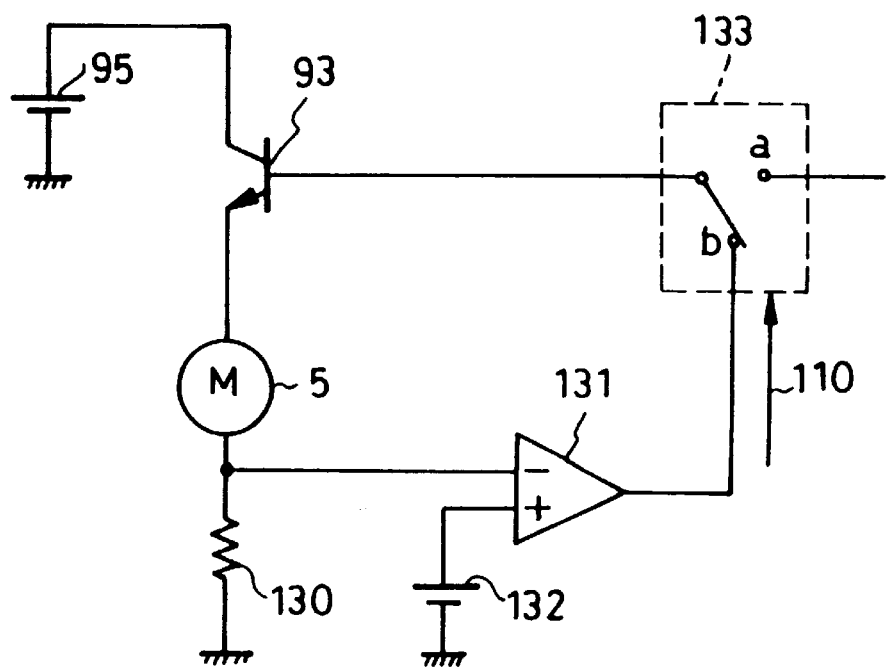
FIG. 13 is a schematic electrical diagram of another modified motor driver circuit according to the present invention.

2. Instead of the current regulating circuit 111, FIG. 8, of the motor servo and driver circuit 8', a current detecting resistor could be connected in series with the motor, as indicated at 130 in FIG. 13. A voltage corresponding to the detected current and a reference voltage from its source 132 could be input to a differential amplifier 131, and the resulting output therefrom could be applied via a switch 133 to the base of the transistor 93, thereby realizing the constant current driving of the motor during the $t_1$–$t_2$ period in FIG. 11.

3. The CAV servo circuit 81b, FIG. 3, could be omitted.

4. The photodetector could be split into two sections instead of four as in the illustrated embodiments.

5. The invention could be applied to devices for CAV servo reading of CAV recorded disks, and those for CAV reading of CLV recorded disks.

6. The invention could be applied not only to CD-ROM drives but to other optical, as well as magnetic, disk drives, too.

What is claimed is:

1. In an apparatus for data recovery from rotating data storage disks of varying physical qualities, the apparatus having a disk drive motor for imparting rotation to a disk, and a power supply for powering the disk drive motor, a method of determining a speed at which each disk is to be read according to the quality of the disk, the method comprising the steps of:

(a) driving the disk drive motor, together with a data storage disk loaded into the apparatus, with a first power, which is sufficiently high to energize the motor to a first predetermined speed, for a first preassigned period of time which is sufficiently long to permit the motor to gain a second predetermined speed which is less than the first predetermined speed;

(b) driving the motor with a second power, which is less than the first power, for a second preassigned period of time following the lapse of the first preassigned period of time, the second preassigned period of time being not less than a period of time required for the motor to pick up speed and gain steady state rotation at the first predetermined speed after the lapse of the first preassigned period of time;

(c) detecting a steady state speed of rotation of the motor upon lapse of the second preassigned period of time; and (d) determining a speed at which the disk is to be read, on the basis of the detected steady state speed of the motor.

2. The method of claim 1 wherein the first power with which the disk drive motor is driven for the first preassigned period of time is a full power of the power supply.

3. The method of claim 1 wherein the disk drive motor is energized with a constant current during the second preassigned period of time.

4. The method of claim 3 wherein the constant current is of magnitude sufficient to maintain the disk drive motor in steady state rotation at the first predetermined speed.

5. The method of claim 1 which further comprises:

(a) preparing, from experimentation of data storage disks, a table listing various steady state speeds of the disk drive motor and corresponding speeds at which disks are to be read; and (b) referring the detected steady state speed of the motor to the table in order to determine a speed at which the disk is to be read.

6. The method of claim 1 which further comprises holding the speed at which the disk is to be read, until the disk is withdrawn from the apparatus.

7. An apparatus for data recovery from rotating data storage disks of varying physical qualities, wherein the improvement resides in the combination of:

(a) a power supply;

(b) disk drive means including a disk drive motor powered from the power supply for imparting rotation to a data storage disk;

(c) first commanding means connected to the disk drive means for causing the disk drive motor, together with a data storage disk loaded into the apparatus, to be driven with a first power, which is sufficiently high to energize the motor to a first predetermined speed, for a first preassigned period of time which is sufficiently long to permit the motor to gain a second predetermined speed which is less than the first predetermined speed;

(d) second commanding means connected to the disk drive means for causing the disk drive motor, together with the disk, to be driven with a second power, which is less than the first power, for a second preassigned period of time following the lapse of the first preassigned period of time, the second preassigned period of time being not less than a period of time required for the motor to pick up speed and gain steady state rotation at the first predetermined speed after the lapse of the first preassigned period of time;

(e) speed detection means connected to the motor for detecting a steady state speed of rotation of the motor upon lapse of the second preassigned period of time; and (f) read speed determination means connected to the speed detection means for determining a speed at which the disk is to be read, on the basis of the detected steady state speed of the motor.

8. The apparatus of claim 7 further comprising:

(a) a servo circuit connected between the power supply and the disk drive motor for constant speed rotation of the motor;

(b) a current regulator circuit; and (c) a selector switch for selectively connecting the power supply to the servo circuit either directly or via the current regulator circuit, the selector switch being under the control of the second commanding means for holding the power supply connected directly to the servo circuit during the first preassigned period of time, and for holding the power supply connected to the servo circuit via the current regulator circuit during the second preassigned period of time.

9. The apparatus of claim 7 further comprising:

(a) memory means for storing a table listing various steady state speeds of the disk drive motor and corresponding speeds at which disks are to be read;

(b) the read speed determination means being connected to the memory means for referring the detected steady state speed of the motor to the table in order to determine a speed at which the disk is to be read.

10. The apparatus of claim 7 further comprising:

(a) memory means connected to the read speed determination means for holding the determined speed at which the disk is to be read, until the disk is withdrawn from the apparatus.

* * * * *